UNITED STATES PATENT OFFICE.

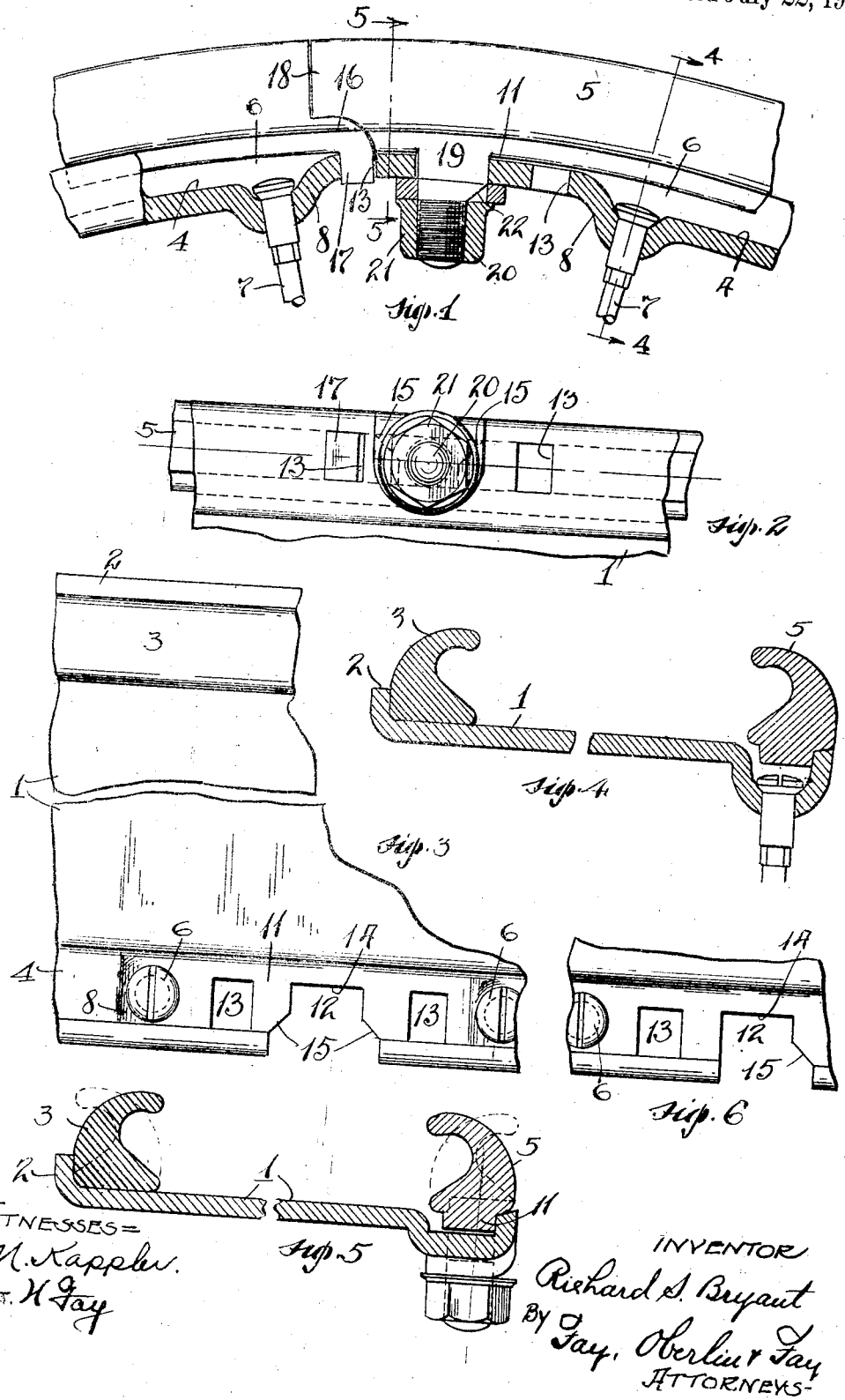

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,310,603.  Specification of Letters Patent.  Patented July 22, 1919.

Original application filed October 14, 1913, Serial No. 795,076. Divided and this application filed July 22, 1915. Serial No. 41,263.

*To all whom it may concern:*

Be it known that I, RICHARD S. BRYANT, a citizen of the United States, and a resident of Cleveland, county of Cuyahoga, and State of Ohio, have invented a new and useful Improvement in Rims for Vehicle-Wheels, of which the following is a specification, the principle of the invention being herein explained and the best mode in which I have contemplated applying that principle, so as to distinguish it from other inventions.

The present improvements, relating as indicated, to rims for vehicle wheels, have more particular regard to tire supporting rims such as are used on automobiles and the like, provided with a detachable flange on one side to facilitate the removal or replacing of a tire. In the preferred construction, such detachable flange is transversely split, and means required to be provided for securing or locking its ends to the rim so as to hold the flange in place on the latter. The object of the present invention, accordingly, is to provide a satisfactory device for use in this connection, and with this object in view the invention then consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—

Figure 1 is a part side elevation and part section of my improved rim construction with the detachable flange shown in place; Fig. 2 is a bottom plan view of the same; Fig. 3 is a top plan view of the rim by itself; Fig. 4 is a transverse section of such rim and flange taken on the line 4—4, Fig. 1; Fig. 5 is a similar transverse section of the rim and flange shown in Fig. 1, but taken on the plane indicated by the line 5—5, in said figure; and Fig. 6 is a plan view of a modification.

The rim 1, illustrated in the aforesaid drawing, is more especially designed for use on a wheel having wire spokes, but it will be understood that the improved locking device of present interest, is equally adapted for use on wood spoke wheels. The feature of construction in the illustrated rim, thus adapting it for use with wire spoke wheels, forms the subject matter of a separate application for United States Letters Patent, filed by me October 14, 1913, Serial No. 795,076, out of which the present application has been required to be divided.

The rim 1, is provided along its one edge, or side, with a permanent flange 2, either adapted to directly engage with the corresponding side of the tire, shoe, or else, as illustrated in Figs. 4 and 5, to serve as an abutment for a separable ring 3, which is designed to thus engage with the tire. Where such a separable ring is employed, it may be, if desired, of the reversible type of construction adapted to coöperate either with a clencher, or a straight-sided (Dunlop) tire. Along the other edge or side of the rim is formed a depression, or groove 4 that encircles such rim and is adapted to receive a split detachable ring or flange 5 which is designed to coöperate with the other side of the tire and secure the same in place. The outer wall of said groove lies flush with or below the outer face of the rim and such split ring is adapted to interlock with this wall when said ring is fitted in the groove, as will be readily understood.

As illustrated in Figs. 1, 3 and 4, the same groove in which such split detachable ring is held, is utilized to receive the heads 6 of the corresponding series of wire spokes 7. To this end the groove, instead of being formed with a flat bottom as heretofore, is made with a rounded bottom so that a space is left below the flat, *i. e.* cylindrical, inner face of the ring to accommodate the heads of the spokes. Depressions 8, inclined in the proper direction, are furthermore made in the bottom of the groove to provide seats for such heads.

At the point in the periphery of the rim where it is desired to provide means for locking to said rim the ends of the split ring 5, the portion of the bottom of said groove, lying between two adjacent spoke ends, is raised to present a flat bearing surface 11, as shown in Figs. 1 and 5, against which surface the under faces of such ends of the ring are adapted to contact. This raised, flattened position of the groove bottom is then provided with a lateral notch 12 or the shape clearly shown in Fig. 3, and with two rectangular recesses or apertures 13, one on each side of such notch. The notch comprises a rectangular seating portion 14 with flaring or beveled end walls 15 extending outwardly therefrom toward the edge of the rim; in other words, each end of the notch is formed with two transverse portions and an intermediate outwardly beveled portion, as clearly shown in Fig. 3.

The one end of the split ring is formed with a projection 16 terminating in a downwardly turned lug 17 of the lateral form clearly appearing in Fig. 1, and of a cross sectional form adapted to substantially fit either one of the rectangular apertures 13 in the bottom of the groove. As shown in Figs. 1 and 2, such lug is in place in the aperture to the left of the notch, but in the reverse position of the ring it would be fitted in the aperture on the right. The other end of the ring terminates in a projection 18 of a form complementary to that presented by the projection 16 just described, such second end being, in effect, undercut so as to overlap the projection on the first end, as clearly illustrated in Fig. 1. Said second end is furthermore provided with a downwardly turned lug 19, either integral therewith or rigidly attached thereto and having at its base a cross-sectional form adapted to fit the inner rectangular portion 14 of the notch 12 when the end is in proper place. This lug has its outer end 20 threaded to receive a nut 21, as shown in Fig. 1, and it also includes an intermediate portion 22 with a beveled face adapted to engage with the end wall of the notch.

From the foregoing description it will be seen that the lug 19 on such second end of the split ring 5 may be easily forced laterally into place by engagement of its outer portion 20 with the bevel 15 in the end wall of the notch itself; while, upon pressing downwardly, having regard to the axis of the wheel, the intermediate beveled face 22 on the lug itself assists in forcing the lug into its final locking position, drawing up, or pulling, on the ring incidentally to doing so, until such end of the ring engages the first end, as shown in Fig. 1.

The outer transverse portion of the end wall of the notch may be used as a temporary rest for the lug on the end of the ring when the latter is brought preliminarily in place, thus obviating the annoyance occasioned by the tendency of such ring-end to fly off. The arrangement of the beveled surfaces 15 and 22 in the notch and on the lug respectively is such that the ring-end may be forced into place by relatively gentle pressure as compared with present constructions in which pounding and prying are required. Furthermore, the beveled shoulder 20 on the lug, it will be observed, immediately forces the threaded portion 22 out of contact with the notch, and so prevents bruising of the threads thereon.

The manner of using my improved construction of rim should be fully evident from the foregoing description and from the construction and operation of its several parts. As indicated, it is not necessary, where it is not desired to reversibly use the detachable split ring, that two apertures 13 should be provided, or that the notch 12 should be doubly beveled, for, as shown in Fig. 6, in such case a single aperture 13 will suffice and the notch need be beveled only at one end, namely that farthest removed from such aperture.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a tire-supporting rim having a groove along its one edge, said rim being formed with a lateral notch intersecting such groove and with an aperture in such groove adjacent such notch; of a split ring adapted to seat in such groove; a projection on one end of said ring, said projection terminating in an inwardly directed lug adapted to engage such aperture; a projection on the other end of said ring adapted to over-lap said first projection, and an inwardly directed lug on such other ring-end adapted to engage such notch, the end of such notch farthest removed from such aperture being formed with a transverse lug-engaging portion and with an outwardly beveled portion to facilitate such engagement.

2. The combination with a tire-supporting rim having a groove along its one edge, said rim being formed with a lateral notch intersecting such groove and with an aperture in such groove adjacent such notch; of a split ring adapted to seat in such groove; a projection on one end of said ring, said projection terminating in an inwardly directed lug adapted to engage such aperture; a projection on the other end of said ring adapted to over-lap said first projection, and an inwardly directed lug on such other ring-end adapted to engage such notch, said last-named lug having a radial portion for thus engaging such notch and with a beveled portion to facilitate such engagement.

3. The combination with a tire-supporting rim having a groove along its one edge, said rim being formed with a lateral notch intersecting such groove and with an aperture in such groove adjacent such notch; of a split ring adapted to seat in such groove; a projection on one end of said ring, said projection terminating in an inwardly directed lug adapted to engage such aperture; a projection on the other end of said ring adapted to over-lap said first projection, and an inwardly directed lug on such other ring-end adapted to engage such notch, the end of such notch farthest removed from such aperture being formed with a transverse portion and with an outwardly beveled portion, and said lug having its co-acting face formed with a radial portion and with a downwardly beveled portion, whereby such engagement is facilitated.

4. The combination with a tire-supporting rim having a groove along its one edge, said rim being formed with a lateral notch intersecting such groove and with an aperture in such groove adjacent such notch; of a split ring adapted to seat in such groove; a projection on one end of said ring, said projection terminating in an inwardly directed lug adapted to engage such aperture; a projection on the other end of said ring adapted to over-lap said first projection, and an inwardly directed lug on such other ring-end adapted to engage such notch, the end of such notch farthest removed from such aperture being formed with a transverse portion and with an outwardly beveled portion, and said lug having its co-acting face formed with a radial portion and with a downwardly beveled portion, whereby such engagement is facilitated; and a nut threaded on the inner end of said lug and adapted to secure the same in such engagement.

Signed by me, this 17 day of July 1915.

RICHARD S. BRYANT.

Attested by—
  R. C. COOLEY,
  C. J. SMITH.